United States Patent [19]

Tanaka

[11] Patent Number: 5,725,352
[45] Date of Patent: Mar. 10, 1998

[54] MULTI-ARTICULATE ARM TYPE TRANSPORT DEVICE

[75] Inventor: Sadao Tanaka, Kanagawa, Japan

[73] Assignee: Sony Corporation, Tokyo, Japan

[21] Appl. No.: 649,722

[22] PCT Filed: Nov. 22, 1994

[86] PCT No.: PCT/JP94/01978

§ 371 Date: May 22, 1996

§ 102(e) Date: May 22, 1996

[87] PCT Pub. No.: WO95/14555

PCT Pub. Date: Jun. 1, 1995

[30] Foreign Application Priority Data

Nov. 22, 1993 [JP] Japan ................... 5-314013
Jan. 28, 1994 [JP] Japan ................... 6-024951

[51] Int. Cl.⁶ ................................................. B25J 18/00
[52] U.S. Cl. ............................................. 414/741.5; 901/15
[58] Field of Search ........................ 414/744.5; 901/15; 74/490.01, 490.03, 490.08, 490.09

[56] References Cited

U.S. PATENT DOCUMENTS 4,728,252  3/1988  Lada et al. ................. 414/744.5

FOREIGN PATENT DOCUMENTS

4122589  4/1992  Japan.

*Primary Examiner*—Donald W. Underwood
*Attorney, Agent, or Firm*—Ronald P. Kananen

[57] ABSTRACT

A multi-articulate arm type transporting device includes first and second link sets. The link sets are operatively connected with first and second driving means which independently rotate the link arrangements about a common axis. The two driving means are controlled by first and second controllers which are responsive to control inputs to respectively produce first and second outputs to the first and second driving means to respectively rotate the link arrangements in accordance with a predetermined schedule. This schedule includes one or more modes which operates motors of the two drive means in a manner which obviates the so-called jack-knife phenomenon wherein the links tend to lock-up and refuse to respond to torque applied from the motors of the drive means.

9 Claims, 8 Drawing Sheets

MULTI-ARTICULATE ARM TYPE TRANSPORT DEVICE

BACKGROUND OF THE INVENTION

1. Field of the Invention

This invention relates to a multi-articulate arm type transporting device for transporting a plate-shaped article, such as a semiconductor wafer or a disc substrate.

2. Description of the Related Art

The multi-articulate arm type transporting device is employed for automatically transporting a plate-shaped component, such as a semiconductor wafer or a disc substrate, between process steps or within a process which requires highly accurately positioning.

Prior-art examples of the multi-articulate arm type transporting device, are disclosed in the following applications. JP Patent Kohyo 2-500179, entitled "Multi-Articulated Arm Type Transporting Device", has first and second articulated arms movably connected to each other, a platform and a motor for driving one of the articulate arms. The articulate arm is extended or contracted by the motor for effecting linear movement of the platform with the article set thereon.

The JP Patent Kokai 2-311237, entitled "Transporting Device", has a pair of driving side gears axially mounted on the distal ends of a first link arm which are in meshing engagement with each other, a pair of meshing connecting gears axially mounted on the distal ends of a second link arm, a transport table rotatably supporting the distal ends of the second link arm and a resilient member secured to one end of the second link arm. The driving side gears are fitted with a left-side pair and a right-side pair of links in the form of first and second link arms having one ends rotatably connected to each other.

When the driving side gears are rotated by the driving motor, the paired links are extended or contracted at the connected portions for effecting linear movement of the transport table with the article set thereon. The resilient member causes additional rotation of the second link arm to prevent the occurrence of a jack-knife phenomenon in a so called "stacked" state of the first and second link arms wherein the link arms are aligned with one another.

The multi-articulate arm type transporting devices of the above-described prior art examples are adapted for highly accurately positioning and shifting the transport table with the article set thereon. However, these prior-art devices suffer from the drawback that, since the transport table is able to perform only a linear movement, the devices can be used only for transporting extremely limited types of articles.

Another prior-art example of a multi-articulate arm type transporting device, having an extended range of movement, is disclosed in JP Patent Kokai No. 59-97861 entitled "Link Type Robot" This multi-articulate arm type transporting device has two sets of first and second links, in which the distal ends of the first link arm and the second link arm of the sets of links are coaxially supported in a state wherein they are vertically separated from each and in manner to constitute a closed loop.

The first link arms are driven by separate servo motors for shifting a transporting section provided at the distal end of the second link arm substantially within a range of 180° centered about a supporting shaft of the first link arm.

The above-described representative example of the conventional multi-articulate arm type transporting device is explained in detail with reference to FIGS. 1 and 2. A multi-articulated arm type transporting device 1 has a left-side set of links 5A made up of first link arms 3A, 3B rotatably connected to each other by a connecting shaft 2A and a right-side set of links 5B made up of first link arms 4A, 4B rotatably connected to each other by a connecting shaft 2B. The first and second link arms 3A and 3B are supported at the opposite ends thereof by driving shafts 6A and 6B, respectively.

These driving shafts 6A, 6B are rotatably supported via bearing frames 7A, 7B by a frame of the device and are fitted with driving gears 9A, 9B having the same number of teeth and meshing with each other. The driving shaft 6A is connected to the motor 11 via a speed reducing unit 10 so as to be driven by the motor 11. The rotational operation of the driving shaft 6A is transmitted to the first link arm 3A and transmitted via the driving gear 9B meshing with the driving gear 9A to the to the opposite side first link arm 3B.

The second link arms 4A, 4B are provided on the opposite sides thereof with supporting shafts 12A, 12B. The supporting shafts 12A, 12B are fitted with connecting gears 13A, 13B having the same number of teeth and meshing with each other. A transporting table 14 for setting and transporting an article, not shown, is supported by the supporting shafts 12A, 12B.

If, with the above-described multi-articulate arm type transporting device 1, the motor 11 rotates driving shaft 6A by means of the speed reducing unit 10. When the driving shaft 6A in the multi-articulate arm transporting device is rotated clockwise in FIG. 1, the first link arm 3A is rotated clockwise. The other corresponding first link arm 3B is rotated counterclockwise when the driving gear 9B meshing with the driving gear 9A provided on the driving shaft 6A is rotated counterclockwise and the driving shaft 6B integral with the driving shaft 9B is thereby rotated.

Thus, the second link arms 4A, 4B are rotated in a direction in which the distal ends thereof provided with the connecting gears 13A, 13B meshing with each other are opened apart outwardly with the connecting shafts 2A, 2B as the fulcrum points. This causes the transport table 14, provided on the distal ends of the second link arms 4A, 4B to be moved upward in FIG. 1 on a straight line interconnecting the center of the driving shafts 6A, 6B and the center of the supporting shafts 12A, 12B.

Figure 1:
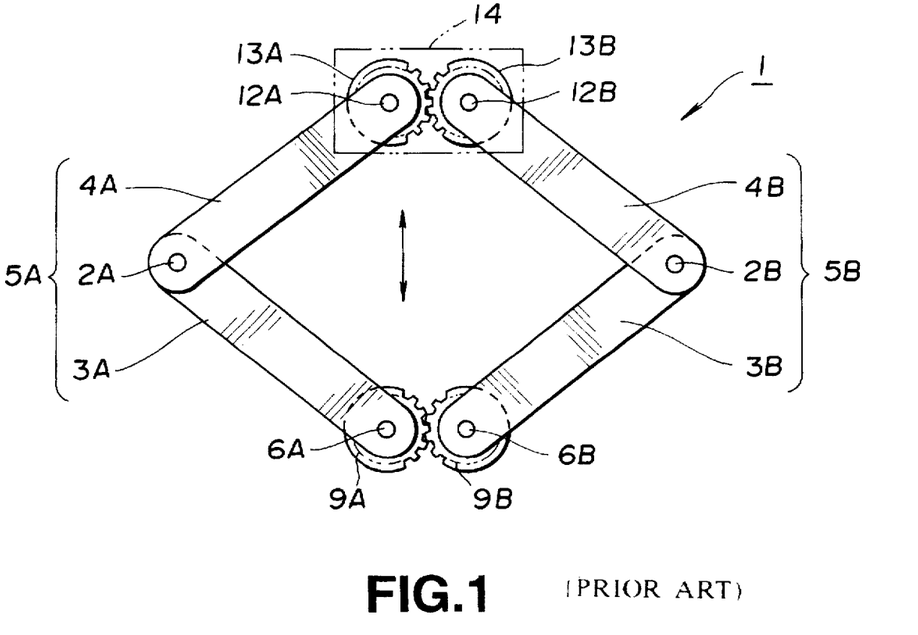
FIG. 1 is a schematic plan view showing a basic construction of a conventional multi-articulate type transport device.
Figure 2:
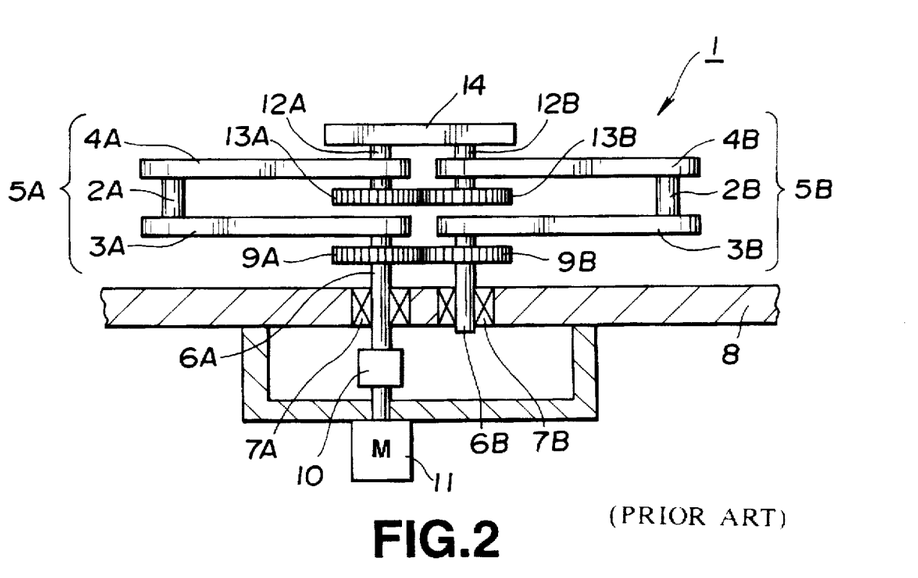
FIG. 2 is a schematic side view showing the basic construction of the conventional multi-articulate type transport device, with a portion thereof being broken away.

With the multi-articulate arm transporting device 1, the first link arm 3A is rotated counterclockwise by the driving shaft 6A being rotated counterclockwise in FIG. 1. The opposite side first link arm 3B is rotated clockwise by the driving gear 9B, which meshes with the driving gear 9A provided on the driving shaft 6A, being rotated clockwise and the driving shaft 6B being rotated integrally with the driving gear 9B.

Thus, the second link arms 4A, 4B are rotated in a direction in which the distal ends thereof having intermeshing connection gears 13A, 13B are rotated inward in a closing direction with the connecting shafts 2A, 2B as the fulcrum points. The above-described multi-articulate arm transporting device 1 is of such a construction in which left-side link set 5a and the right-side link set 5B, made up of the first link arms 3A, 3b and the second link arms 4A, 4B, are interconnected at both ends by driving gears 9A, 9B and connecting gears 13A, 13B, the play produced at the connecting portions of the link arms cancel each other so that the transport table 14 is moved with a high degree of accuracy.

With the multi-articulate arm transporting device, when the transport table 1 is moved along a straight line interconnecting the center of the driving shafts 6A, 6B and the center of the supporting shafts 12A, 12B, a so-called jack-knife phenomenon may occasionally be produced in which the transport table 1 halts in a state in which the first link arms 3A, 3B and the second link arms 4A, 4B are aligned over one another and this stacked state (referred to hereinafter as a neutral point) is not resolved when re-driving the device. This jack knife phenomenon is hereinafter explained with reference to FIGS. 3 to 5.

Figure 3:
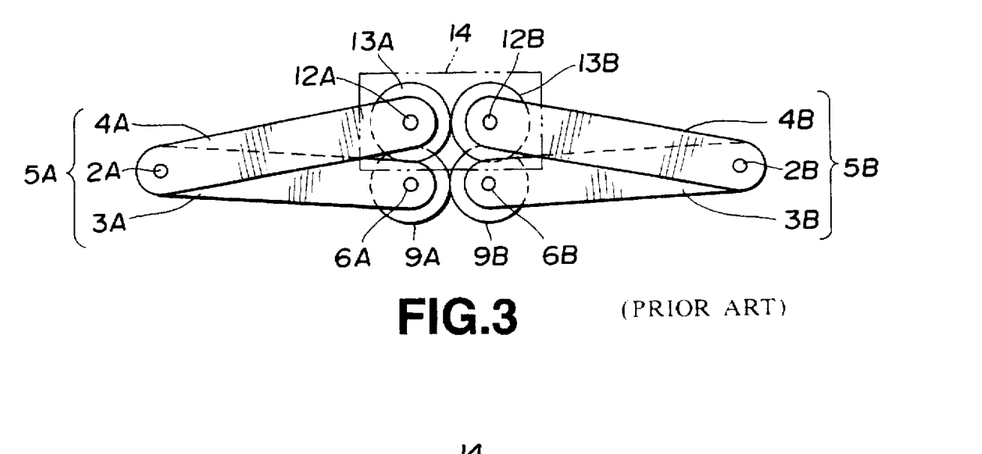
FIG. 3 is a plan view showing the conventional multi-articulate type transport device, with the first and second link arms 3 and 4 having been moved to a point immediately before becoming stacked together.
Figure 4:
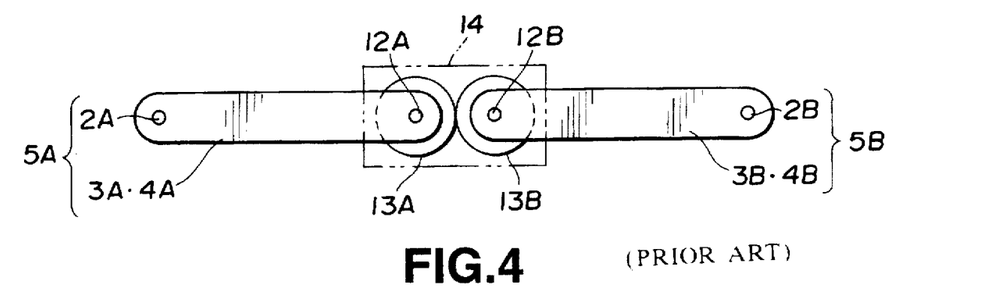
FIG. 4 is a plan view showing the conventional multi-articulate type transport device, with the first and second link arms 3 and 4 having been moved to the point of being stacked together.

With the multi-articulate arm transporting device 1, when the motor 11 operated and the driving shaft 6A is rotated counterclockwise in FIG. 3, the second link arms 4A, 4B are rotated in the direction in which the distal ends thereof are closed towards the inside with the connecting shafts 2A, 2B as the center. If the multi-articulate arm transporting device 1 is driven to the neutral point, that is to the state in which the first and second link arms 3A, 3B and 4A, 4B are "stacked" one over the other, it may occur that the transport table 14 presents an indefinite state in which the transport table 14 may be moved upward or downward, as shown in FIG. 4.

Figure 5:
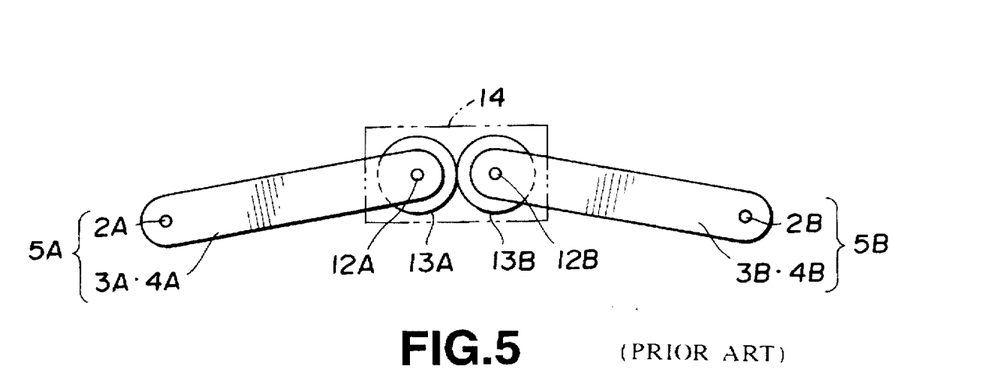
FIG. 5 is a plan view showing the conventional multi-articulate type transport device, with the first and second link arms 3 and 4 being stacked together to incur the jack-knife phenomenon.

If the multi-articulate arm transporting device 1 is halted in the neutral point, that is in the state in which the first and second link arms 3A, 3B and 4A, 4B are stacked together, and driven again, it may occur that the first and second link arms 3A, 3B and 4A, 4B refuse to move and remain stacked together. Accordingly, the transport table 14 remains in the halted state and cannot be moved, as shown in FIG. 5 (jack-knife phenomenon).

The first and second link arms 3A, 3B and 4A, 4B are arranged and designed so that the distances between one ends thereof rotatably connected to each other by the connecting shafts 2A, 2B and the opposite ends provided with the driving gears 9A, 9B or the connecting gears 13A, 13B are equal on the left and right sides. Thus, with the first and second link arms 3A, 3B and 4A, 4B stacked together, the meshing force between the driving gears 9A, 9B and the connection gears 13A, 13B acts as a force of constraint onto the left and right connection shafts 2A, 2B.

The jack-knife phenomenon is thought to result from the fact that, since the maximum mechanical load acts on respective parts when the first and second link arms 3A, 3B and 4A, 4B pass through the neutral point, the first and second link arms 3A, 3B and 4A, 4B are not rotated relative to each other with the supporting shaft 2 as the center of rotation but are transiently halted at the neutral point.

As explained above, if the multi-articulate arm transporting device is operated with a sufficient range of movement for the transport table 14, the jack-knife phenomenon is produced when the first and second link arms 3A, 3B and 4A, 4B pass through the neutral point. On the other hand, if the multi-articulate arm transporting device is designed so as to be halted before the first and second link arms 3A, 3B and 4A, 4B become stacked in order to avoid the occurrence of the jack-knife phenomenon, there is imposed a limitation on a range of movement of the transport table 14.

It is therefore an object of the present invention to provide a multi-articulate arm type transporting device capable of highly accurately position-controlling a transport table transporting a plate-shaped article, such as a semiconductor wafer, and also capable of highly accurately transporting an article between process steps or within a process step, with the transport table being operated over an extremely broad range without the transport table being halted halfway due to the jack-knife phenomenon occurring between the link arms.

SUMMARY OF THE INVENTION

In order to accomplish the above and other objects, the multi-articulate arm transporting device of the present invention includes first and second link arms making up left and right link sets and rotatably connected at one ends via connecting shafts. The first link arms have the opposite ends supported on the same axis and rotationally driven by independent driving means. The second link arms are provided at the opposite side ends with a transport table via posture holding or maintaining means.

The driving means is controlled by a numerical control unit at the opposite side ends of the second link means for transporting the transport table provided at the opposite ends of the second link arms via posture holding means to a pre-set transport position. The numerical control unit controls the operation of the first and second link arms via driving means so that the jack-knife phenomenon is not produced.

DETAILED DESCRIPTION OF THE PREFERRED EMBODIMENTS

Referring to the drawings, preferred embodiments of the present invention will be explained in detail.

Figure 6:
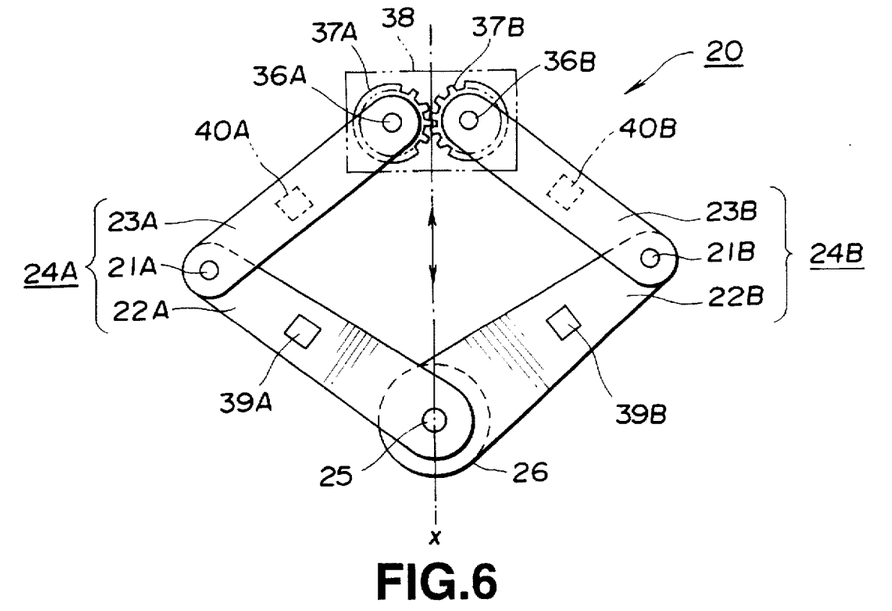
FIG. 6 is a schematic plan view showing the basic construction of a multi-articulate arm transporting device according to the present invention.
Figure 7:
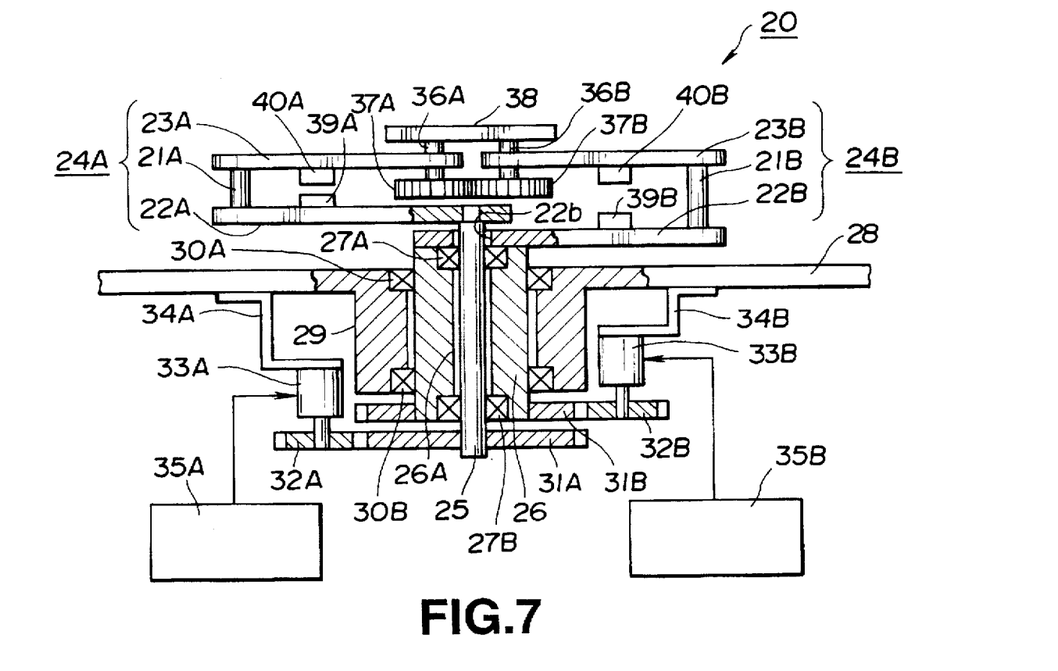
FIG. 7 is a schematic side view showing the basic construction of the multi-articulate arm transporting device shown in FIG. 6, with a portion thereof being broken away.

A multi-articulate arm transporting device 20 embodying the present invention is employed for automatically transporting a plate-shaped article, such as a semiconductor wafer or a disc substrate, between process steps or within a process step in a highly accurately positioned state. The multi-articulated arm type transporting device 20 has a left-side set of links 24A made up of first link arms 22A, 22B rotatably connected to each other near one ends thereof by a connecting shaft 21A and a right-side set of links 24B made up of second link arms 23B, 23B rotatably connected to each other by a connecting shaft 21B. The first and second link arms 22A and 22b have their opposite ends supported by a common driving support shaft 25.

That is, the left-side first link arm 22A is directly secured to one end of the driving support shaft 25. The right-side first link arm 22B has its one end slightly enlarged in width. In this enlarged width portion is formed an opening 22b passed through by the driving support shaft 25. A bearing sleeve shaft 26 has its one end secured concentrically in the opening 22b. The bearing sleeve shaft 26 is formed with an opening 26A for accommodating the driving support shaft 25 which is connected to left-side first link arm 22A, and supports the driving support shaft 25 by way of bearings 27A, 27B. The bearing sleeve shaft 26 is rotatably supported via bearings 30A, 30B by a tubular bearing section 29 formed integrally with a frame 28.

A driving gear 31A is secured to the opposite end of the driving support shaft 25. The driving gear 31A meshes with an output gear 32A of a servo motor 33A which acts as a driving source for the left side set of links 24A. A driving gear 31B is secured to the opposite end of the bearing sleeve shaft 26. The driving gear 31B meshes with an output gear 32B of a servo motor 33B which acts as a driving source for the right side set of links 24B. The servo motors 33A, 33B are supported by motor mounting members 34A, 34B mounted on the frame 28.

The servo motors 33A, 33B are respectively controlled by numerical control units 35A, 35B, respectively. The numerical control units 35A, 35B include a sequencer, such as a micro-computer, not shown in detail, and an analog amplifier for driving the servo motors 33A, 33B. The numerical control units 35A, 35B driving-control the servo-motors 33A, 33B in accordance with an operating program stored in an internal storage unit or supplied via an external input, for driving a set of links 34A, 34B.

The second link arms 23A, 23B are respectively provided with supporting shafts 36A, 36B of an equal length in the vicinity of the ends thereof opposite to the ends by which the link arms are rotatably connected to the first link arm 22 via the connecting shafts 21A, 21B. The connecting shaft 21B of the right set of links 24B is slightly longer in length than the connecting shaft 21A of the left set of links 24A so that the left and right second link arms 23A, 23b are located on the same height level. The supporting shafts 36A, 36B are rotatable with respect to the second link arms 23A, 23B. A set of connecting gears 37A, 37B are secured to one bottom side ends of the supporting shafts 36A, 36B, as shown in FIG. 7. The connecting gears 37A, 37B are of the same number of teeth and mesh with each other within the same plane.

A transport table 38 for setting and transporting a plate-shaped article, such as a semiconductor wafer or a disc substrate thereon, is secured on the supporting shafts 36A, 36B for facing the second link arms 23A, 23B. The transport table 38 is of an elongated rectangular profile and is held in the horizontal position by being secured to one ends of the same length supporting shafts 36A, 36B in the position of left-and-right symmetry as explained above. The transport table 38 is held in the stabilized position since the opposite ends of the supporting shafts 36A, 36B are interconnected by the connecting gears 37A, 37B. In other words, the connecting gears 37A, 37B make up a position control section of the transport table 38.

First position sensors 39A, 39B are mounted at a mid-position on the front surface of the first link arms 22A, 22B, respectively. Similarly, second position sensors 40A, 40B are mounted in registration with the first position sensors 39A, 39B at a mid-position on the back surface of the second link arms 23A, 23B, respectively. These position sensors 39, 40 output a detection signal on detection of the stacked state of the first and second link arms 22A and 22B in the course of the article transport movement as later explained. Of course, the position sensors 39, 40 may be provided on one of the left and right sets of links 24A, 24B.

The article transporting movement of the above-described multi-articulate arm type transporting device 20 is now explained. With the multi-articulate arm type transporting device 20, in which the servo motors 33A, 33B are independently driven by outputs of the numerical control units 35A, 35B, the operation of the vertical linear movement of the transport table 38 with respect to a straight line passing vertically through the driving support shaft 25 indicated by x-axis in FIG. 6 is explained. The servo motors 33A, 33B are controlled for rotating the first link arms 22A, 22B at the same velocity.

When the servo motor 33A is operated, the driving, gear 31A is rotated via the output gear 32A. The rotation of the driving gear 31A is transmitted via the driving support shaft 25 to the first link arm 22A for driving the left set of links 24A. When the driving support shaft 25 is rotated counter-clockwise in FIG. 6, for example, the first link arm 22A is also rotated counterclockwise, as indicated by a chain line in FIG. 8, with the second link arm 23A being rotated clockwise via the connecting shaft 21A for actuating the entire left set of links 24A in the closing direction.

When the servo motor 33B is operated, the driving gear 31B is rotated via the output gear 32B. The rotation of the driving gear 31B is transmitted via the bearing sleeve shaft 26 to the first link arm 22B for driving the right set of links 24B. When the bearing sleeve shaft 26 is rotated clockwise in FIG. 6, for example, the first link arm 22B is also rotated clockwise, as indicated by a chain line in FIG. 8, with the second link arm 23B being rotated counterclockwise via the connecting shaft 21B for actuating the entire right set of links 24B in the closing direction.

Figure 8:
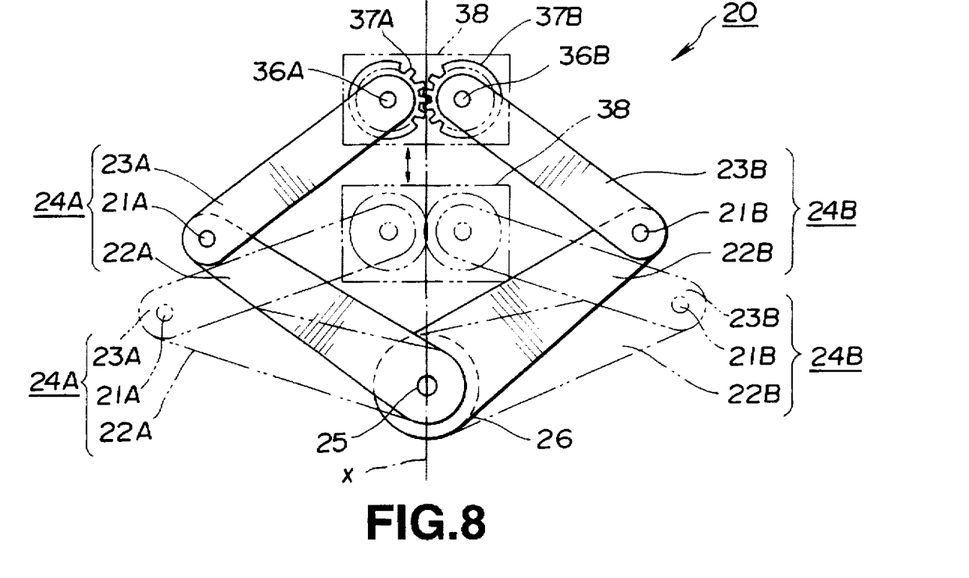
FIG. 8 is a plan view of the multi-articulate arm transporting device shown in FIG. 6, with first and second driving means being operated in synchronism with each other for effecting linear reciprocating movement of the transport table.
Figure 9:
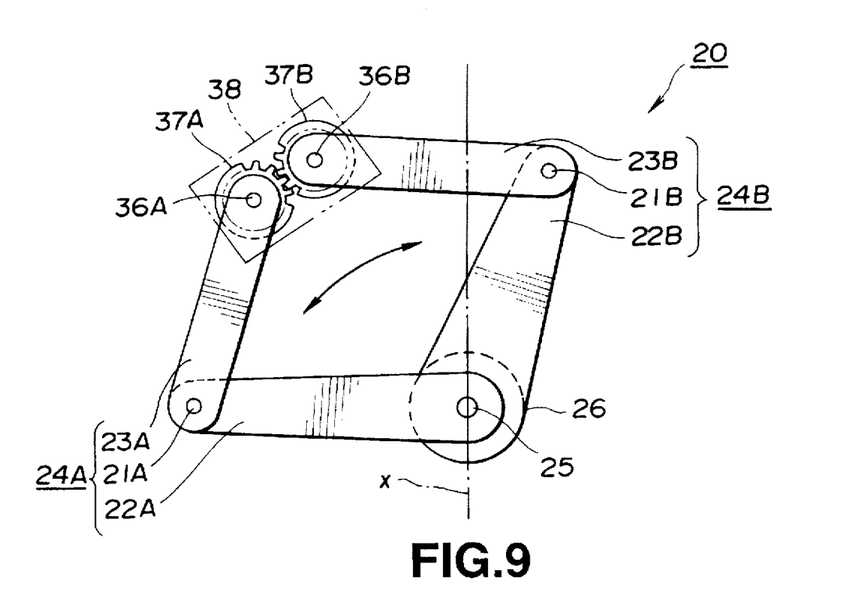
FIG. 9 is a plan view of the multi-articulate arm transporting device shown in FIG. 6, with first and second driving means being independently operated for effecting a rotational movement of the transport table.

Thus, the transport table 38 is moved towards the driving support shaft 25 along the x-axis in a stabilized posture brought about by the meshing of the connection gears 37A, 37B provided at the distal ends of the second link arms 22A, 22B.

On the other hand, when the driving support shaft 25 is rotated clockwise in FIG. 6 by the servo motor 33A, the first link arm 22A is also rotated clockwise, with the second link arm 23A being rotated counterclockwise via the connecting shaft 21A for actuating the entire left set of links 24A in the opening direction. Similarly, when the bearing sleeve shaft 26 is rotated counterclockwise in FIG. 6 by the servo motor 33B, the first link arm 22B is also rotated counterclockwise, with the second link arm 23B being rotated clockwise via the connecting shaft 21B for actuating the entire right set of links 24B in the opening direction.

Thus, the transport table 28 is moved away from the driving support shaft 25 along the x-axis in a stabilized posture brought about by the meshing of the connection gears 37A, 37B provided at the distal ends of the second link arms 22A, 22B.

With the multi-articulate arm type transporting device 20, the transport table 38 can be moved back and forth along the x-axis as described above, while it can also be moved freely to a desired other position, by controlling the rotation of the servo motors 33A, 33B adapted for driving the left and right sets of links 24A, 24B. For example, with the multi-articulate arm type transporting device 20, the servo motor 33A adapted for driving the left set of links 24A is rotated clockwise, in the state shown in FIG. 6, with the servo motor 33B driving the right link set 24B remaining stationary.

This causes counterclockwise rotation of the first link arm 22A through the route of the output gear 32A, driving shaft 31A and the driving support shaft 25, for pulling the second link arm 23A counterclockwise via the connecting shaft 21A. On the other hand, the first link arm 22B is not rotated since the servo motor 33B remains stationary. However, since the second link arm 23B is pulled counterclockwise by the second link arm 23A of the left link set 24A via the transport table 38, the right set of links 24B is rotated about the connecting shaft 21B as the fulcrum point.

If, with the multi-articulate arm transporting device 20 shown in FIG. 6, the servo motor 33A driving the left link set 24A is rotated clockwise at a higher speed, with the servo motor 33B driving the right link set 24B being rotated counterclockwise, the left and right link sets 24A, 24B are closed in their entirety as described above for moving the transport table 38 to a position offset to the left with respect to the x-axis, with the transport able 38 being simultaneously moved towards the driving support shaft 25.

On the other hand, if, with the multi-articulate arm type transporting device 20, shown in FIG. 6, the servo motor 33B driving the right link set 24B is rotated counterclockwise at a higher speed, with the servo motor 33A driving the left link set 24A having been rotated clockwise, the left and right link sets 24A, 24B are closed in their entirety for moving the transport table 38 to a position offset to the right with respect to the x-axis, with the transport table 38 being simultaneously moved towards the driving support shaft 25.

Figure 10:
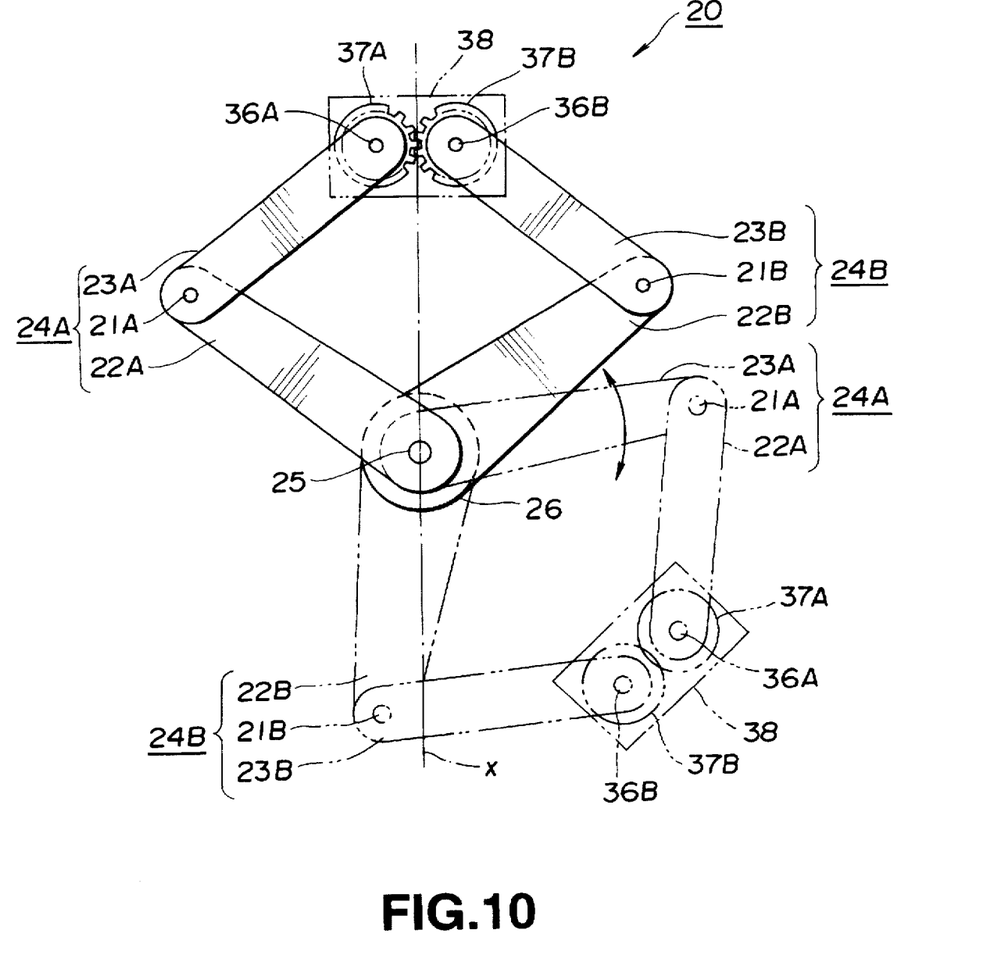
FIG. 10 is a plan view of the multi-articulate arm transporting device shown in FIG. 6, with first and second driving means being independently operated for effecting a rotational movement of the transport table to an opposite area with respect to the center of rotation of the second link arm.

Similarly, if the left-side and right-side servo motors 33A, 33B are rotated clockwise at an equal speed in FIG. 6, the multi-articulate arm type transporting device 20 in its entirety is rotated clockwise with the driving support shaft 25 as a fulcrum point, as indicated by a chain line in FIG. 10, with the left and right link sets 24A, 24*b* remaining in the same state. Thus, the transport table 38 is moved on the same circumference of a circle.

Figure 11:
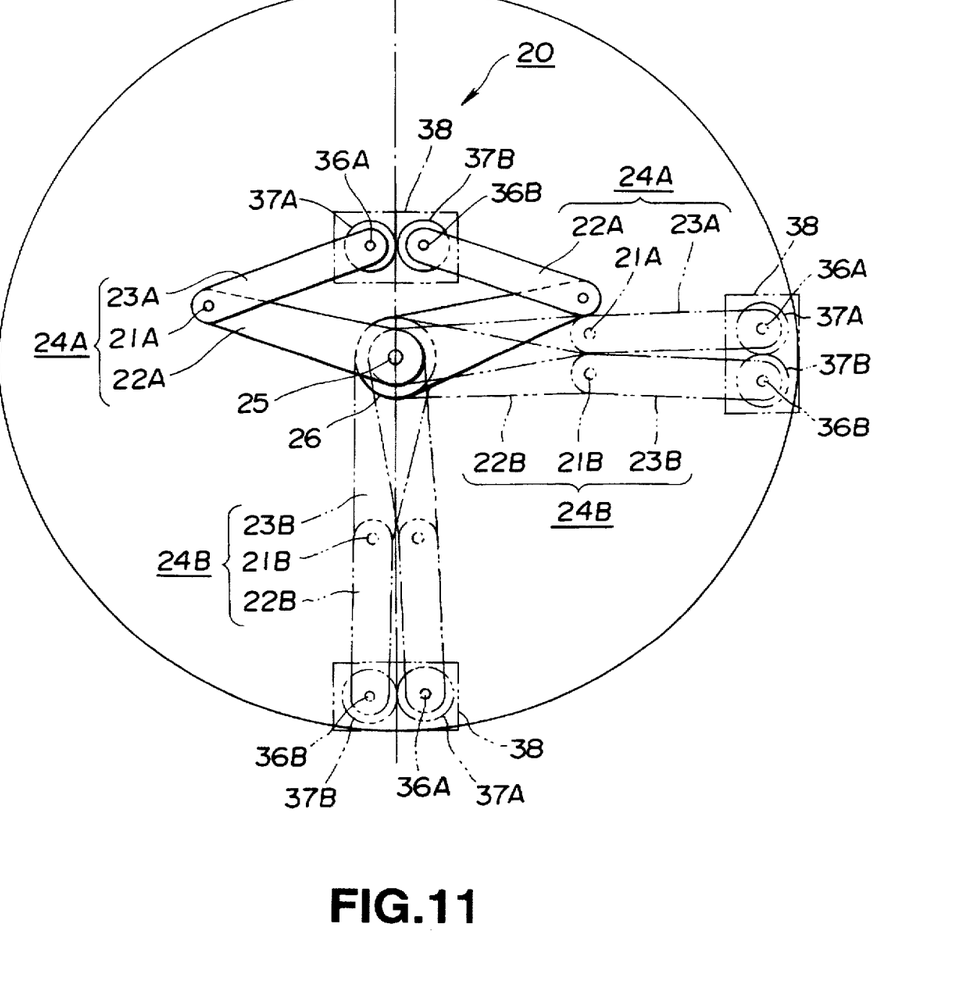
FIG. 11 is plan view for illustrating the range of movement of the transport table in the multi-articulate arm transporting device shown in FIG. 6.

With the multi-articulate arm type transporting device 20, there is no risk of physical collision between the component parts since the first link arms 22A, 22B and the second link arms 23A, 23B making up the left and right link sets 24A, 24B are combined with vertically differential positions. Thus, the transport table 38 may be moved through a circle of 360°, with its radius substantially equal to the length of the first link arms 22A, 22B and the second link arms 23A, 23B, with the driving support shaft 25 as the center of rotation, as shown in FIG. 11.

With the above-described multi-articulate arm type transporting device 20, since the servo motors 33A, 33B are separately mounted on the frame 28, these servo motors 33A, 33B are not moved relative to each other during the driving movement, so that there is no risk that continuous driving be prohibited by servo motor wiring connections.

The above-described multi-articulate arm type transporting device 20 is susceptible to the jack-knife phenomenon which is brought about by the first link arms 22A, 22B and the second link arms 23A, 23B being stacked together by being driven in a range of 360°. Accordingly, the multi-articulate arm type transporting device 20, the servo motors 33A, 33B are controlled by an output of the numerical control units 35A, 35B for prohibiting the occurrence of the jack-knife phenomenon.

Figure 13:
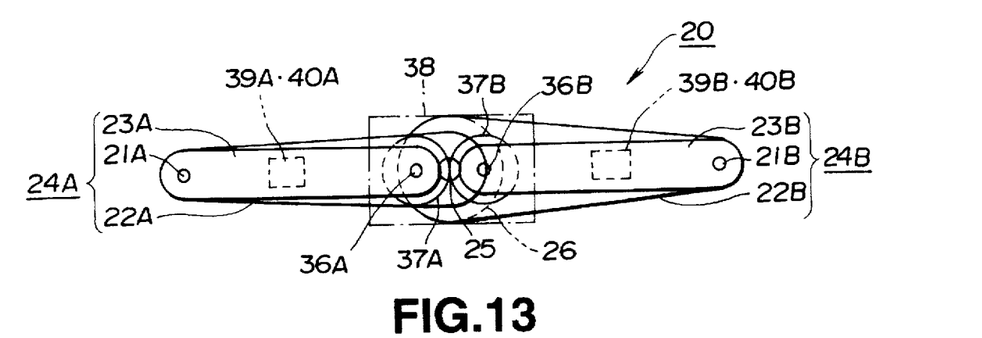
FIG. 13 is a plan view showing the multi-articulate type transport device of FIG. 6, with the first and second link arms passing through the neutral point.

The jack-knife phenomenon is most likely to occur when the operation is halted with the first link arms 22A, 22B and the second link arms 23A, 23B in the neutral position, as shown in FIG. 13. Thus, when halting the first link arms 22A, 22B and the second link arms 23A, 23B when they are close to the neutral point, a program or an external command is supplied to the numerical control units 35A, 35B in a manner to control the first link arms 22A, 22B and the second link arms 23A, 23B so as to halt at a position which evades (viz., is off-set from) the neutral position but which is as close as practical to the same.

Therefore, since the first link arms 22A, 22B and the second link arms 23A, 23B whose halt position is thus set, are halted in a state wherein they do not become stacked together, there is no risk of the jack-knife phenomenon when the servo motors 33A, 33B are subsequently actuated by the next output of the numerical control units 35A, 35B.

Figure 12:
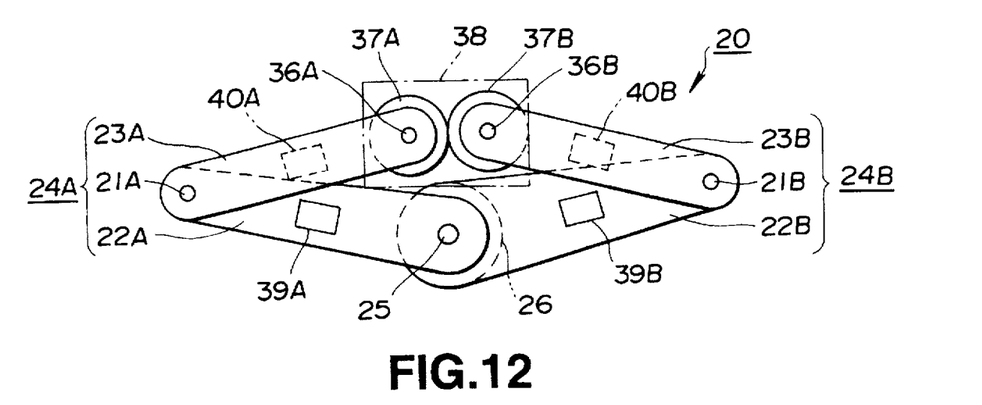
FIG. 12 is a plan view showing the multi-articulate type transport device of FIG. 6, with the first and second link arms having been moved to a point immediately before being stacked together.
Figure 14:
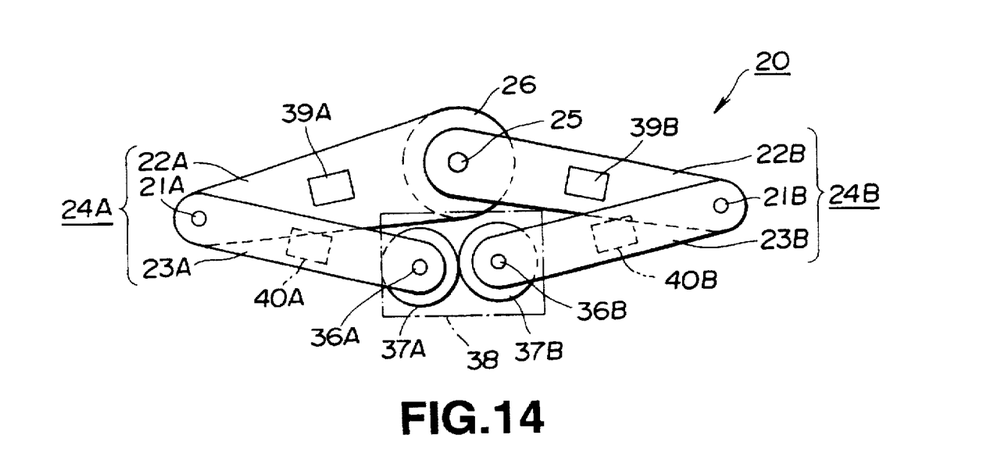
FIG. 14 is a plan view showing the multi-articulate type transport device of FIG. 6, with the first and second link arms having passed through the neutral point.

The jack-knife phenomenon is also likely to occur when the first link arms 22A, 22B and the second link arms 23A, 23B are moved from the state shown in FIG. 12 to the state shown in FIG. 14 after passing through the neutral point as shown in FIG. 13. However, there is no risk of occurrence of the jack-knife phenomenon since the first link arms 22A, 22B and the second link arms 23A, 23B are passed through the neutral point with sufficient momentum.

There may be occasions wherein the first link arms 22A, 22B and the second link arms 23A, 23B are fortuitously halted at the neutral point in the state of being stacked one upon the other. Such state is presumably caused by the fact that actuation of the driving system induces the movement of the link arms 22 and 23, with the component of static friction of the rotating parts becoming the component of dynamic friction thus leading to shape phase transition and increasing play between the elements of the driving parts.

If, with the multi-articulate arm transporting device 20, such state is sensed by the first position sensors 39A, 39B and the second position sensors 40A, 40B, an output of one of the numerical control units 35A and 35B is issued temporally before an output of the other. This causes one of the servo motors 33A and 33B to be driven temporally before the other.

It may be contemplated that, with the multi-articulate arm type transporting device 20, since one of the left link set 24A and the right link set 24B is actuated temporally before the other, the driving operation of the component parts is started from the state in which the component parts remain fixed in the state of components of static friction and the play components of the driving system are small, thus rendering it difficult to incur shape phase transition.

Meanwhile, the actuation of one of the link sets temporally before the other may also be brought about by servo gain adjustment in addition to the above-described control operation of the numerical control units 35A, 35B. If the jack-knife phenomenon is brought about despite the above-mentioned precautions, it may be resolved if one of the first link arms 22A, 22B and the second link arms 23A, 23B is manually moved by the operator.

Figure 15:
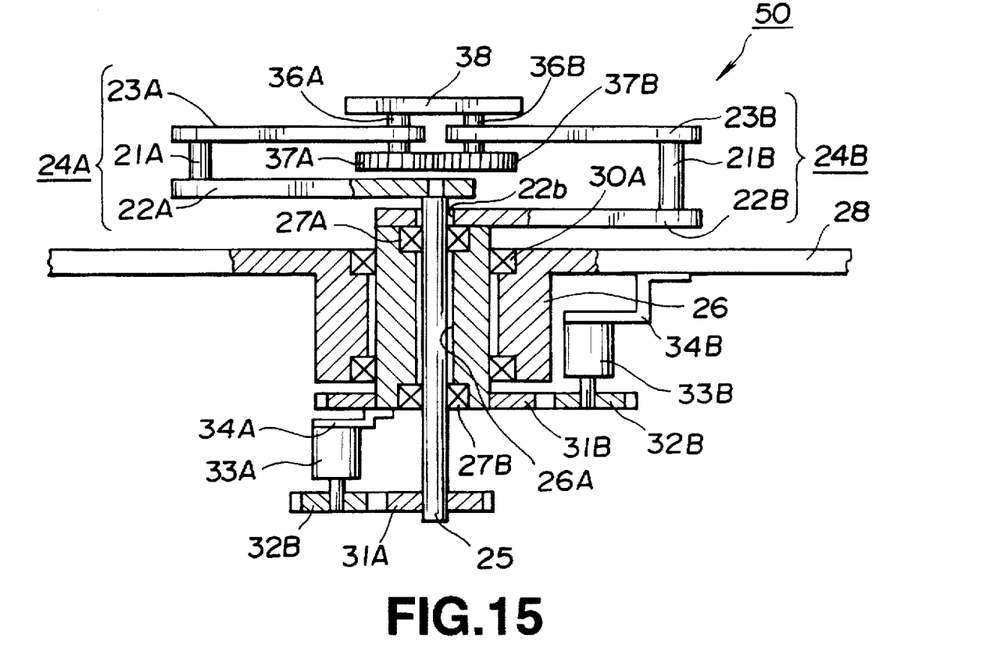
FIG. 15 is a schematic side view showing the basic construction of a multi-articulate arm transporting device according to a second embodiment of the present invention, with a portion thereof being broken away.

FIG. 15 shows a second embodiment of the multi-articulate arm type transporting device 50 of the present invention. The multi-articulate arm transporting device 50 of the present embodiment has its basic construction in common with the previously described first embodiment of the multi-articulate arm type transporting device, so that corresponding parts are denoted by the same reference numerals and the description therefor is omitted for clarity.

With the multi-articulate arm type transporting device 50, the servo motor 33A acting as a driving source for the left link set 24A is mounted on the bearing sleeve shaft 26 constituting the fulcrum point for the right link set 24B. That is, a mounting member 34A has its one end mounted on a lower end face of the bearing sleeve shaft 26. The servo motor 33A is supported by the mounting member 33A.

With the multi-articulate arm transporting device 50, if the servo motor 33B for driving the right link set 24B is rotated, the driving gear 31b is driven via the output gear 32B. The rotation of the driving gear 31B is transmitted via the bearing sleeve shaft 26 to the first link arm 22B constituting the right link set 24. With the multi-articulate arm type transporting device 50, the servo motor 33A for driving the left link set 24A is held in the halted state so that the left link set 24A is rotated by the meshing of the connecting gears 37A, 37B, with the bearing sleeve shaft 26 as the center of rotation.

With the multi-articulate arm type transporting device 50, the left and right link sets 24A, 24B may be actuated by facilitated rotational control of the servo motor 33 as compared to the above-described first embodiment of the multi-articulate arm type transporting device 20.

Figure 16:
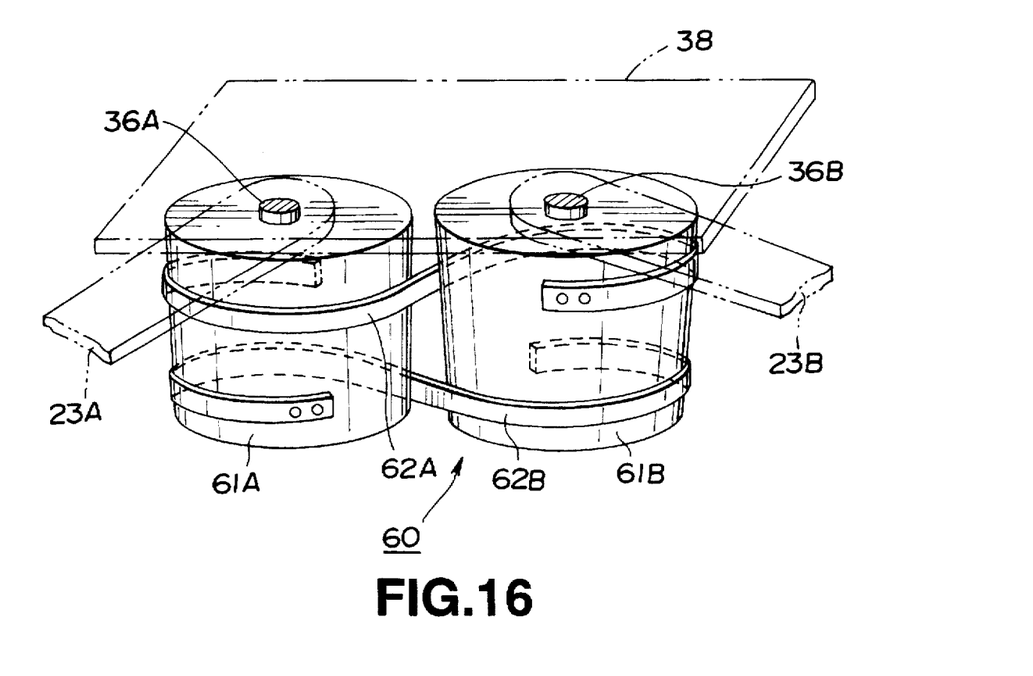
FIG. 16 is a perspective view showing a modification of a posture controlling section of a transport table provided on a multi-articulate arm transporting device according to the present invention.

FIG. 16 shows a second embodiment of a posture controlling unit 60 for controlling the posture of the transport table 38. With the multi-articulate arm type transporting devices 20 and 50, the posture controlling unit is made up of a pair of the connecting gears 37A, 37B. The posture controlling unit 60 is made up of a pair of drums 61A, 61B secured to the supporting shafts 36A, 36B rotatably supported near one ends of the second link arms 23A, 23B, and a pair of belts 62A, 62B cross-wound between the drums 61A and 61B.

Thus, when the second link arm 23A towards the left link set 24A is rotated, the belts 62A, 62B are rewound on the drum 61A for rotationally driving the second link arm 23b of the right link set 24B. Thus, the transport table 38, provided at the opposite ends of the supporting shafts 36A, 36B, is moved in a stabilized state with the operation of the link set 24.

The posture controlling unit may also be constituted by a low pair of frictional wheels having facing outer peripheral surfaces contacted with a moderate frictional force with each other.

In addition, if the bearing units 27, 30 of the multi-articulate arm type transporting devices, the respective bearings are constituted as hermetically sealed units, and the link sets are arranged within a hermetically sealed clean casing, the multi-articulate arm type transporting device may be employed as a transport device for a production line in need of an ultra-clean environment, such as a semiconductor chip processing line.

I claim:

1. A multi-articulate arm type transporting device comprising:

first and second link sets which each include a first link arm and a second link arm which are rotatably connected to each other by first and second connecting shafts;

first and second driving means for independently rotating the first link arms of each of said first and second link sets, about a common axis of rotation;

first and second controllers for respectively and independently controlling said first and second driving means, said first and second controllers being responsive to an input to induce said first and second driving means to respectively rotate the first link arms of the left link set and the right link set to predetermined halt positions which are close to and non-coincident with a neutral position wherein the first and second link arms of each of said first and second link sets are aligned with each other;

a transport table connected to distal ends of the second link arms of said first and second link sets, the second link arms being rotatably connected to the first link arms, said transport table being designed for supporting an article to be transported thereon; and posture controlling means operatively connected with said transport table for controlling the posture of the transport table when moved by said first and second sets of links.

2. A multi-articulate arm type transporting device as claimed in claim 1, wherein the axis of rotation of the first link arms of the first and second link sets passes coaxially through a support shaft which is secured to one of the first link arms and which extends through an opening in a sleeve shaft which is secured to the other of the first link arms.

3. A multi-articulate arm type transporting device as claimed in claim 2, wherein the first driving means and the second driving means respectively include first and second gear means for providing a drive connection with the supporting shaft and the sleeve shaft.

4. A multi-articulate arm type transporting device as claimed in claim 1, further comprising position detection sensors provided on the first and second link arms for detecting the first link arm of each of the first and second link sets being aligned with the corresponding second link arm, said position detection sensor being arranged to generate an output for causing one of said first and second driving means to move one of said first and second link sets a predetermined amount before the other.

5. A multi-articulate arm transporting device as claimed in claim 1, wherein the posture controlling means comprises a pair of meshing gears, said pair of gears being secured to supporting shafts provided at distal ends of the second link arms of the first and second link sets.

6. A multi-articulate arm transporting device as claimed in claim 1, wherein the posture controlling means comprises a pair of drums which are operatively interconnected by a pair of belts which are fixed to and cross-wound around the drums.

7. A multi-articulate arm type transporting device comprising:

first and second link sets which each include a first link arm and a second link arm which are rotatably connected to each other by first and second connecting shafts;

first and second driving means for independently rotating the first link arms of each of said first and second link sets, about a common axis of rotation;

first and second controllers for respectively and independently controlling said first and second driving means, said first and second controllers being responsive to a stop input to respectively produce first and second outputs to said first and second driving means which respectively rotate the first link arms of the left link set and the right link set to respective predetermined neutral positions;

a transport table connected to distal ends of the second link arms of said first and second link sets, the second link arms being rotatably connected to the first link arms, said transport table being designed for setting an article to be transported thereon; and posture controlling means operatively connected with said transport table for controlling the posture of the transport table when moved by said first and second sets of links;

wherein the axis of rotation of the first link arms of the first and second link sets passes coaxially through a support shaft which is secured to one of the first link arms and which extends through an opening in a sleeve shaft which is secured to the other of the first link arms; and wherein the first driving means is mounted on the lower end of the sleeve shaft rotationally driven by second driving means.

8. A multi-articulate arm type transporting device comprising:

first and second link sets which each include a first link arm and a second link arm which are rotatably connected to each other by first and second connecting shafts;

a sleeve shaft which is secured to the first link arm of the first link set;

a support shaft which is secured to the first link arm of the second link set, said support shaft extending through a coaxial opening in said sleeve shaft;

first driving means operatively connected with said sleeve shaft for driving said sleeve shaft to rotate;

second driving means supported on said sleeve shaft for synchronous rotation therewith, said second driving means being operatively connected with said support shaft for driving said support shaft to rotate.

9. A multi-articulate arm transporting device comprising:

first and second drive means;

first and second sets of articulated arms which interconnect an article support table with said first and second drive means;

sensor means for detecting said first and second sets of articulated arms assuming a predetermined configuration wherein said first and second sets of articulated arms are apt to lock and remain stationary irrespective of the application of drive force from said first and second drive means; and control means responsive to said sensor means for causing said first and second drive means to drive said first and second sets of articulated arms with a predetermined difference.

* * * * *